G. Y. BEAL.
STEERING GEAR STABILIZER.
APPLICATION FILED JULY 6, 1921.
1,428,515.
Patented Sept. 12, 1922.
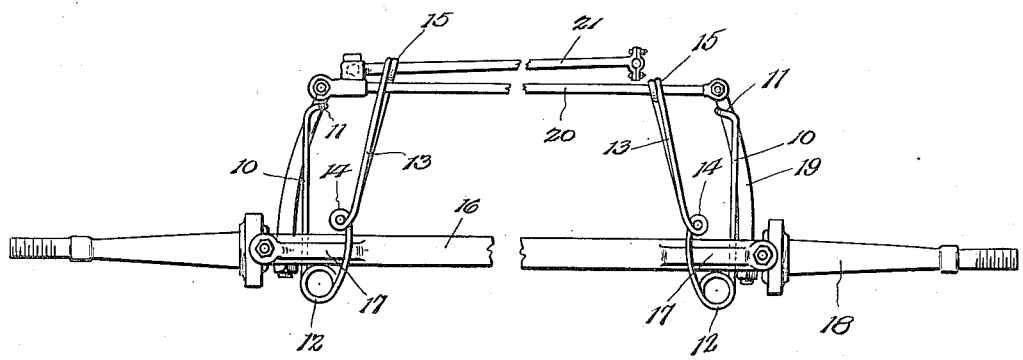
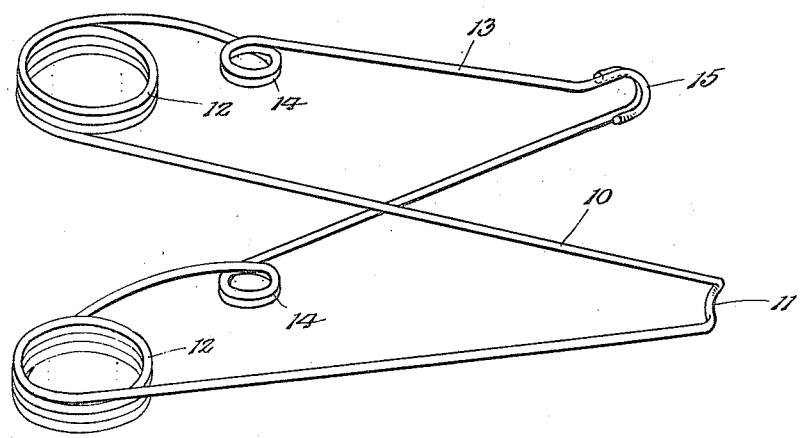
Inventor
G. Y. Beal.
By Lacey & Lacey, Attorneys Patented Sept. 12, 1922.

1,428,515

UNITED STATES PATENT OFFICE.

GEORGE Y. BEAL, OF CHOCTAW, OKLAHOMA.

STEERING-GEAR STABILIZER.

Application filed July 6, 1921. Serial No. 482,824.

*To all whom it may concern:*

Be it known that I, GEORGE Y. BEAL, citizen of the United States, residing at Choctaw, in the county of Oklahoma and State of Oklahoma, have invented certain new and useful Improvements in Steering-Gear Stabilizers, of which the following is a specification.

This invention relates to an improved steering gear stabilizer for motor vehicles and has as one of its principal objects to provide a simple and effective device of this character which will be particularly adapted for use in connection with Ford vehicles but which, at the same time, may also be employed with good results upon automobiles of other makes.

The invention has as a further object to provide a device adapted to resiliently coact between the steering knuckle arms and the connecting rod of a vehicle steering gear to overcome undesirable looseness and wobbling of the front wheels of the vehicle.

And the invention has as a still further object to provide a device which may be readily applied without the necessity for any structural change in the vehicle.

Other and incidental objects will appear hereinafter.

In the drawing:

Figure 1 is a plan view showing a pair of my improved stabilizers connected with the front axle and associated parts of a motor vehicle, and Figure 2 is an enlarged perspective view showing the device in detail.

Referring now more particularly to the drawing, it will be seen that my improved stabilizer is formed from a single length of suitable resilient wire looped to provide an outer arm 10 having diverging sides joined at the free end of the arm by a transverse connecting portion bowed to provide a saddle 11. At the inner ends of the sides of the loop 10, the wire is coiled to form springs 12 and thence continued to define an inner arm 13 similar to the arm 10 but diverging therefrom. The free end portions of the wire are coiled to provide springs 14 in the diverging sides of this arm, the springs 14 lying at the inner sides of the arm in spaced relation to the springs 12, and formed on said sides at their free ends are overlapping hooks 15.

In order to clearly bring out the mounting and operation of my improved stabilizer, I have, in Figure 1 of the drawing, shown the device in connection with the front axle and associated parts of a motor vehicle. The vehicle axle is indicated at 16, this axle being provided at its ends with yokes 17 mounting the usual steering knuckles carrying spindles 18. Extending from said knuckles are steering arms 19 and extending between said arms at their rear ends is a connecting rod 20. Coupled at one end with the connecting rod is a steering rod 21 the opposite end of which is connected with the vehicle steering post. All of this structure is well known, being in common use. As illustrated, a pair of the devices is preferably employed upon each vehicle and, as will be observed, the arms 10 are arranged to extend through the yokes 17 of the axle from the forward side thereof while the sides of the arms 13 of the stabilizers are arranged to straddle the axle, the saddles 11 of the arms 10 being engaged with the inner sides of the steering arms 19 near their rear ends. As is now to be particularly noted, the arm 13 of one of the devices is somewhat longer than the corresponding arm of the other of the devices. The device with the longer arm is arranged at the left, looking at Figure 1, and the hooks 15 of said device are engaged around the steering rod 21 from opposite sides thereof. Similarly, the device with the shorter arm is arranged at the right and the hooks 15 of this latter device are engaged around the connecting rod 20 from opposite sides thereof. The springs 12 of the devices as well as the springs 14 will thus, as will be seen, be held under tension operating to normally maintain the connecting rod 20 at substantially right angles to the arms 19 while swinging of said arms incident to steering of the front wheels will serve to increase the tension upon the springs. Accordingly, the springs will tend to eliminate unnecessary play of the wheels as well as also tend to prevent wobbling thereof. At the same time, the presence of the stabilizers upon the vehicle will in no way interfere with the guiding of the vehicle.

Having thus described the invention, what is claimed as new is:

1. A steering gear stabilizer comprising a substantially V-shaped spring formed from a single length of material bent to define diverging spring arms connected by intermediate coils and each having spaced sides diverging to said coils, one of the arms being formed to extend through the knuckle yoke of an axle engaging a steering arm near its free end and the other of the arms of the spring being formed to straddle the axle engaging a reach rod connected to said steering arm.

2. In combination with a vehicle axle having a yoke, a steering knuckle journaled in said yoke, a steering arm connected to said knuckle, and a reach rod connected to said arm, of a stabilizing spring having diverging spring arms one extending through the yoke engaging the steering arm and the other arm of the spring straddling the axle engaging said rod.

3. In combination with a vehicle axle having a yoke, a steering knuckle journaled in said yoke, a steering arm connected to said knuckle, and a reach rod connected to said arm, of a stabilizing spring having diverging spring arms connected by intermediate coils and each having spaced sides diverging to said coils, one of the arms of the spring extending through said yoke engaging the steering arm and the other of the arms having its sides straddling the axle engaging said rod.

In testimony whereof I affix my signature.

GEORGE Y. BEAL. [L. S.]